Feb. 25, 1947.                W. R. COTTINGHAM              2,416,470
                          DOUGHNUT FORMING DEVICE
                           Filed April 7, 1944
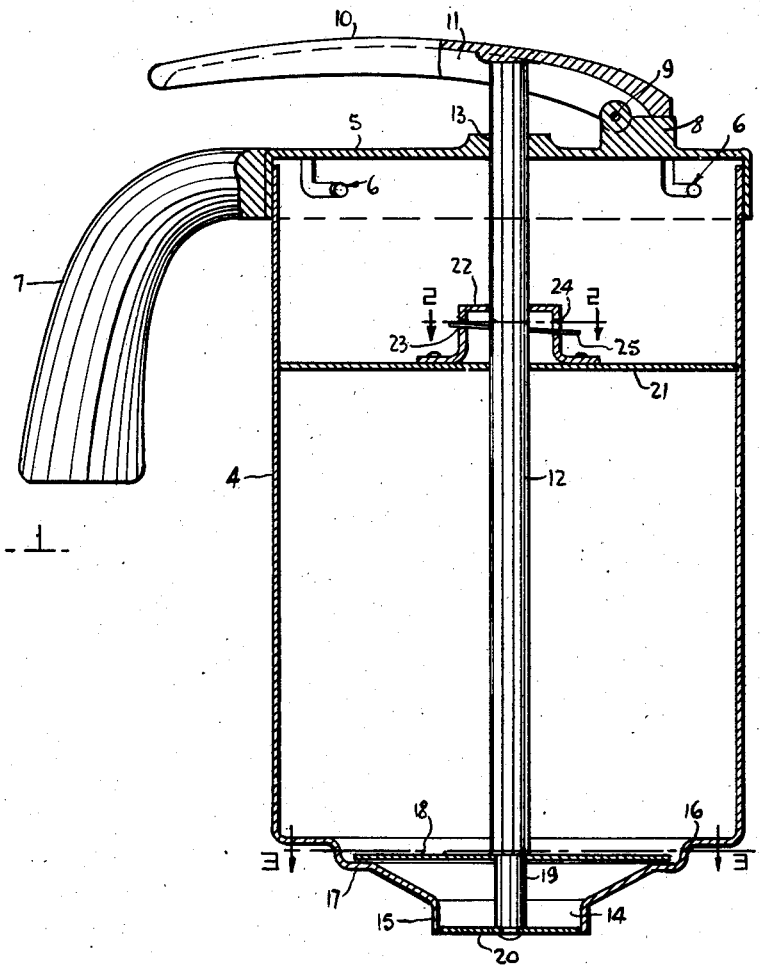
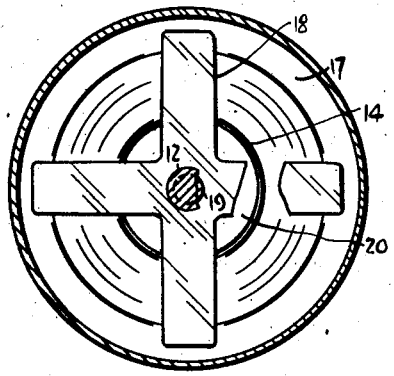
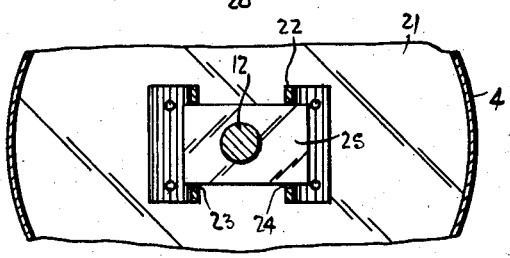
Inventor
WILLARD R. COTTINGHAM
By Carlsen + Hagle
                                                    Attorneys Patented Feb. 25, 1947

2,416,470

UNITED STATES PATENT OFFICE 2,416,470

DOUGHNUT FORMING DEVICE

Willard R. Cottingham, Minneapolis, Minn.

Application April 7, 1944, Serial No. 529,929

4 Claims. (Cl. 107—14)

This invention relates to baking equipment, and the primary object is to provide a comparatively simple, efficient and practical device, particularly adapted for home for domestic use, but which may also be utilized to advantage in bakeries, restaurants, and other establishments where foods are prepared, for forming dough rings such as required in the making of doughnuts.

Heretofore doughnuts have been prepared either in complicated and expensive machines, or by hand cutters or other devices that are slow and unhandy to operate, and in most instances require much handling of the dough and spreading of dough and equipment over large areas, all of which is objectionable as being unsanitary, involving excessive amount of labor, and frequently resulting in unsatisfactory baking conditions and results.

With the present device the dough is placed in a simple, tight, and sanitary container, so as not to be exposed to air and dust, and is expelled therefrom, by the mere manipulation of a hand lever, in a succession of rings all of which are uniform in size, shape, consistency and baking qualities.

In the accompanying drawing, which illustrates a preferred embodiment of the invention—

Fig. 1 is a diametrical sectional elevation through the device.

Fig. 2 is a cross section on line 2—2 in Fig. 1.

Fig. 3 is a sectional detail on line 3—3 in Fig. 1.

Referring to the drawing more particularly and by reference characters, 4 designates a cylindrical container or receptacle which is preferably formed of sheet metal but may be made of composition, plastic, or other suitable substances.

The top of the container 4 is closed by a cover 5 which is preferably secured by pin and bayonet slot connections 6, so that it can be quickly and easily attached and removed. Extending rigidly from the cover 5 is a pistol grip type handle 7 by which the entire device is supported in the operator's hand, and this handle may be integral with the cover, as shown. The cover is further provided with an integral upstanding lug 8 to which is fulcrumed, as at 9, an operating lever 10, so arranged that it can be conveniently depressed by the thumb of the operator's hand gripping the handle 7. The underside of the handle is preferably recessed, as at 11, so as to receive the upper end of a rod 12 that extends through a center aperture 13 in the cover. When the lever 10 is depressed it will move the rod 12 down a predetermined distance or stroke, as will be evident. It will also be noted that when the cover 5 is turned, to be released, it can be removed without interfering with or removing the rod 12.

The rod 12 extends axially down through the container and into a bottom aperture 14 formed by a short cylindrical flange 15 which extends from the bottom 16 of the container. This bottom has an annular shoulder 17 upon which rests the ends of a star spring 18 having arms which extend from a central portion that is perforated to receive the reduced lower end 19 of the rod 12. The shoulder thus formed on the rod rests on the spring and the spring is so shaped and tensioned that it will yieldingly hold the rod up in contact with the lever 10. At its bottom end the rod is provided with a disk 20 that snugly fits within the flange 15 but is projected from the aperture 14 when the lever 10 is depressed.

In the upper end of the container is disposed a plunger plate 21 which is slidable longitudinally therein, and has a central aperture through which the rod 12 passes. Upon this plate is mounted an inverted U-shaped bracket 22, also apertured to centrally receive the rod. The legs of this bracket have slots 23 and 24 in which rests a metallic strip or plate 25, also having an aperture through which the rod 12 passes. The slot 23 is slightly higher than the slot 24, and narrower, vertically, so as to serve as a loose fulcrum for the member 25, while the slot 24 is sufficiently deep to permit vertical oscillation of the end of the member 25 extending into it. The aperture in the piece 25 is of such size that the rod 12 may move freely through it, when the piece is at right angles to the axis of the rod; but when the piece 25 is slightly inclined, as shown in Fig. 1, downward movement of the rod will cause the piece 25 to bind or bite on the rod. Thus, when the rod is moved downwardly, as by action of lever 10, it will force the plate 21 downwardly with it, but when the rod moves upwardly it will slightly lift the right end of the piece 25, thus eliminating the friction or grip, and permits the rod to move upwardly without carrying the plate 21 with it.

In the operation of the device, the cover 5 with parts 7, 10, 21, 22 and 25, are removed, but the rod 12, with its disk 20 and the spring 18 are preferably left in the position shown. The dough is then filled into the receptacle, and the plate 21 is inserted, being pressed down to substantially confine the dough below it in a consistent mass. The binding member 25 will of course prevent upward movement of the dough. At the lower end of the receptacle the dough will readily move down between the arms of the spring until stopped by the valve plate or disk 20. The cover 5, with its attached members, is then secured in place, and the unit is ready for use.

By momentarily depressing the lever 10 the operator depresses the rod 12 and by so doing moves the valve disk 20 and the plate 21 downwardly an equal distance. This action opens the port 14 annularly to permit a ring of dougsh to be discharged and that ring is sheared off by releasing the lever 10, as the spring 18 lifts the rod and thus restores the disk 20 to its initial position. The spring 18 is so formed and positioned that it maintains the axial alignment of the disk in the port 14 when the disk is in projected position, thus insuring that it will return in its centered alignment.

It will be observed that since the plate 21 is considerably larger in area than disk 20 its downward movement will have a compressing effect on the dough thus causing the latter to be discharged under pressure. The displacement and compression thus resulting insures the dough being forced down below the spring in contact with the disk, and as the latter opens the dough is expelled in a circularly continuous and consistent ring ready for baking. The operation can them be repeated very rapidly, and with but little experience a housewife or baker can soon learn to operate the device very efficiently.

When the container has been emptied it can quickly be refilled, and when the batch of doughnuts has been made the device can be easily cleaned because by merely removing the cover all of the parts can be lifted out and washed.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A doughnut forming machine comprising a dough receptacle having a dough discharge opening, a valve member normally closing the opening but projectable therefrom, a rod extending from the member and through the receptacle for operation at its other end to open the opening by projecting the valve, a plunger in the receptacle and having an aperture for the passage of the rod therethrough, means for alternately connecting and disconnecting the rod with respect to the plunger whereby movements of the rod in one direction will actuate the plunger and movements of the rod in the opposite direction will be independent of the plunger, and a spring connecting the lower parts of the rod and receptacle for yieldingly holding the rod in valve closed position and for axially guiding the rod when the valve is projected from the opening.

2. A doughnut forming machine comprising a dough receptacle having a dough discharge opening, a valve member normally closing the opening, a rod extending from the member and through the receptacle for operation at its other end to open the opening by projecting the valve member from the opening, a plunger in the receptacle and having an aperture for the passage of the rod therethrough, means for alternately connecting and disconnecting the rod with respect to the plunger whereby movements of the rod in one direction will actuate the plunger and movements of the rod in the opposite direction will be independent of the plunger, and a spring connecting lower ends of the rod and receptacle for yieldingly holding the rod in valve closed position and for guiding the rod when the valve is projected, said spring consisting of a leaf member having arms extending from the rod for bearing engagement at their ends with the receptacle.

3. A doughnut forming device comprising a dough receptacle having a discharge opening at its lower end, a valve normally closing the opening and projectable therefrom to open the same, a rod extending axially down through the receptacle to the valve to operate the latter, means for depressing the rod, a spider spring in the lower end of the receptacle apertured to receive the rod and having arms extending outwardly to engage the receptacle, said rod having a stop engageable by the spring whereby the spring will raise the rod and close the valve when the rod is released from the depressing means, said spring being operative to guide the lower end of the rod when the valve is projected.

4. A doughnut forming device comprising a dough receptacle having a discharge opening in its lower end, a cover detachably secured to the upper end, a valve element normally closing the discharge opening and of such diameter that it may move upwardly through the discharge opening, a rod slidable in the cover and attached at its lower end to the valve element, a plunger in the receptacle slidably associated with the rod, and lever means fulcrumed on the cover for actuating the rod, said rod, plunger and valve element being removable upwardly from the receptacle when the cover is removed, said rod merely having end abutting contact with the lever means whereby the cover and lever means may be removed relatively upwardly from the rod and without removing the lever means from the cover.

WILLARD R. COTTINGHAM.

REFERENCES CITED

The following references are of record in the file of this patent:

UNITED STATES PATENTS

| Number | Name | Date |
|---|---|---|
| 2,292,661 | Rush | Aug. 11, 1942 |
| 2,261,427 | Witt | Nov. 4, 1941 |
| 2,197,270 | Helland | Apr. 16, 1940 |
| 2,175,543 | Valle | Oct. 10, 1939 |
| 2,148,774 | Petzelt | Feb. 28, 1939 |
| 2,143,353 | Korpan | Jan. 10, 1939 |
| 1,397,510 | Grassi | Nov. 22, 1921 |